United States Patent
Whyte

(10) Patent No.: US 7,953,716 B2
(45) Date of Patent: May 31, 2011

(54) METHOD FOR DETERMINING PARTICIPATION IN A DISTRIBUTED TRANSACTION

(75) Inventor: James R. H. Whyte, Berkshire (GB)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/348,112

(22) Filed: Jan. 2, 2009

(65) Prior Publication Data

US 2009/0113431 A1 Apr. 30, 2009

Related U.S. Application Data

(63) Continuation of application No. 11/314,556, filed on Dec. 21, 2005, now Pat. No. 7,487,160.

(30) Foreign Application Priority Data

Dec. 23, 2004 (GB) .................................. 0428109.3

(51) Int. Cl.
*G06F 17/30* (2006.01)
(52) U.S. Cl. ........................................ 707/703; 718/101
(58) Field of Classification Search .................... None
See application file for complete search history.

(56) References Cited

U.S. PATENT DOCUMENTS

| | | | |
|---|---|---|---|
| 5,193,188 A | 3/1993 | Franaszek et al. | |
| 5,371,886 A | 12/1994 | Britton et al. | |
| 5,664,181 A | 9/1997 | Velissaropoulos et al. | |
| 5,841,984 A | 11/1998 | Marine et al. | |
| 6,205,464 B1 | 3/2001 | Cobb et al. | |
| 6,874,104 B1 | 3/2005 | Josten et al. | |
| 2002/0174162 A1 | 11/2002 | Perks et al. | |
| 2004/0123293 A1 | 6/2004 | Johnson | |

*Primary Examiner* — Mohammad Ali
*Assistant Examiner* — Syed H Hasan
(74) *Attorney, Agent, or Firm* — Andrea Bauer; Hoffman Warnick LLC

(57) ABSTRACT

A method and system for determining whether a plurality of participants who are participating in a distributed transaction have registered their intention to commit their part of the transaction with a transaction manager, the method comprising the steps of: receiving a message from a participant, the message comprising a character sequence identifying the participant and the part of the transaction which the participant is processing; analyzing the character sequence to determine whether the character sequence further comprises an identifier for identifying whether a subsequent message is to be received by a second participant; and in dependence on the identifier identifying that there are no further subsequent messages to be received, informing each of the participants to commit their part of the transaction.

13 Claims, 7 Drawing Sheets

Fig. 4

| TX parts received 400 | State 405 | Waiting for 410 |
|---|---|---|
| Null – (415) | Null | Nothing |
| 1.1 – (420) | Waiting for more | |
| 1.2 – (425) | Waiting for more | |
| 1.3 – (430) | Waiting for more | |
| – (435) | Does not received 1.4n because it is a pass-through agent | Either 1.4n or its children |
| 1.4n.1 – (440) | Indicates no more messages expected by more 1.4n.n records expected. Waiting for more | |
| – (445) | Does not receive 1.4n.2 because it is a routing node | |
| 1.4n.3 – (450) | Waiting for more | Either 1.4n.3 or its children |
| 1.4n.4n – (455) | Indicates no more 1.n.n messages expected | |
| 1.4n.2.1 – (460) | Waiting for more | |
| 1.4n.2.2 – (465) | Waiting for more | |
| 1.4n.2.3 – (470) | Waiting for more | |
| 1.4n.2.4n – (475) | This receipt identifies the final participant of the transaction | 10 participants identified |

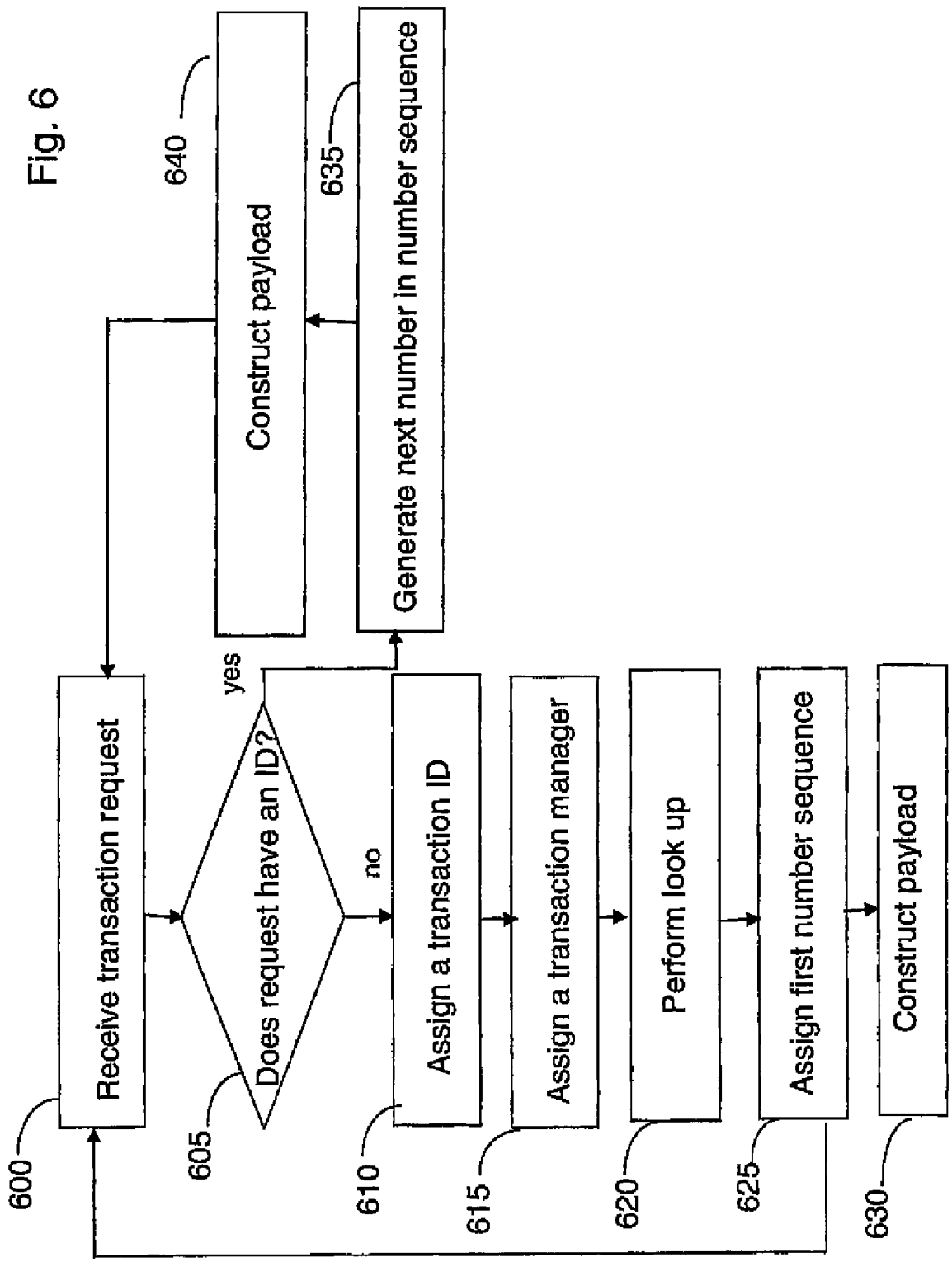

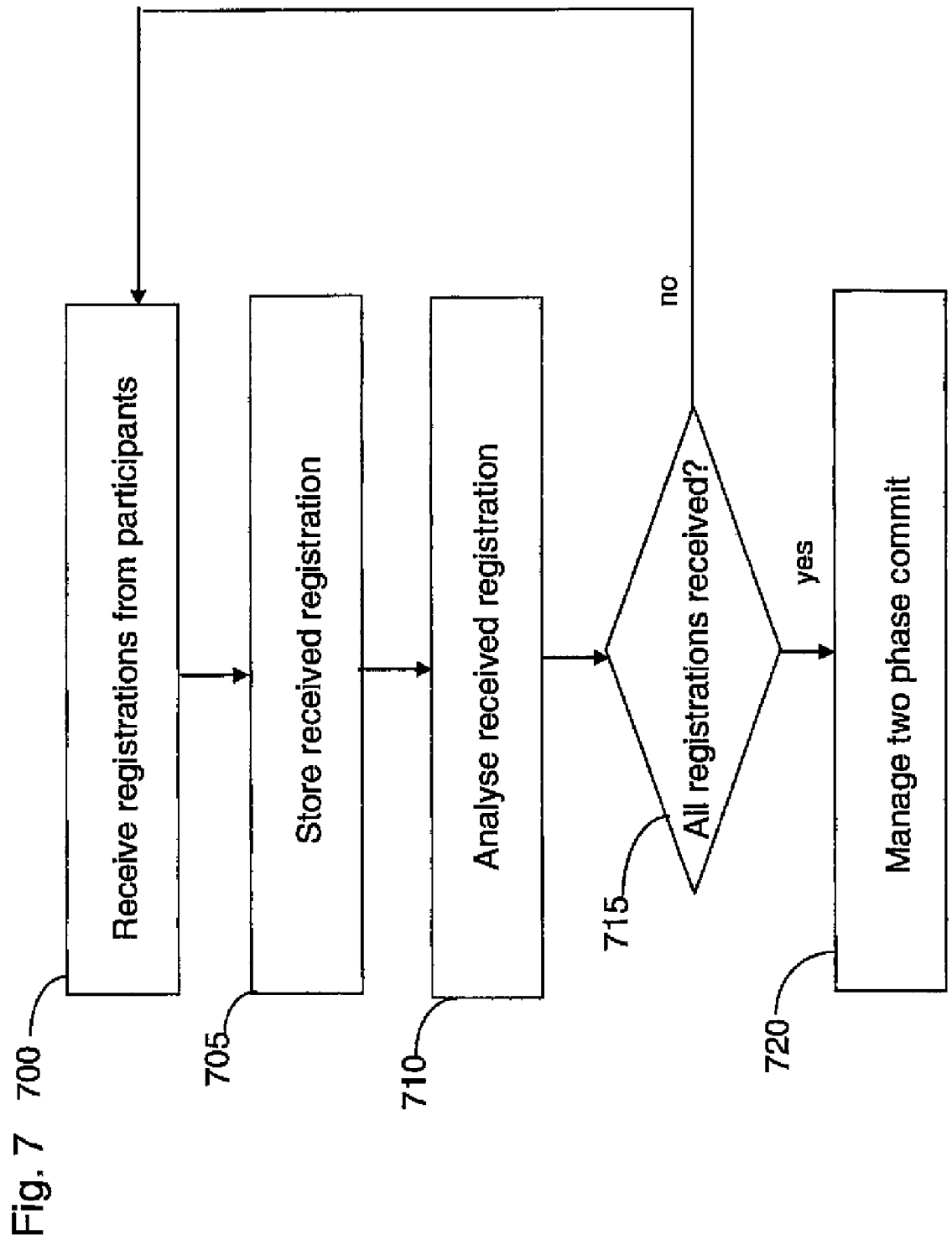

METHOD FOR DETERMINING PARTICIPATION IN A DISTRIBUTED TRANSACTION

CROSS REFERENCE TO RELATED APPLICATIONS

The current application is a continuation application of U.S. patent application Ser. No. 11/314,556, filed on Dec. 21, 2005 now U.S. Pat. No. 7,487,160, which claims priority to United Kingdom Patent Application No. 0428109.3, filed on Dec. 23, 2004. The aforementioned applications are hereby incorporated by reference in their entirety.

FIELD OF THE INVENTION

The invention relates to the field of transaction processing and in particular to a method and a system for determining whether all participants participating in a transaction are registered and accounted for by a transaction manager.

BACKGROUND OF THE INVENTION

Transactional behavior for update activity within a single repository is well understood and has been used by database developers for many years. The transaction technology ensures that multiple actions in order to update a data set in a repository are treated as a single activity and that all updates are either applied or withheld as a single unit of work. The concomitant isolation of the data during this activity ensures that other transactions occurring at the same moment do not see partially updated or pre-updated data. This is known in the art as a single-phase commit.

The concept of single-phase commit has been extended to allow multiple repositories to be updated in a synchronized fashion through the use of two-phase transaction management. The two-phase transaction adds a prepare phase to the standard transaction management; during this phase, the status of the transaction is in doubt. If a failure occurs at this point, a mechanism is available to recover the responses from each repository, and then roll the transaction forwards or backwards depending on those responses.

A problem occurs when trying to perform a two-phase transaction across a number of participants within a transaction. It is important to a transaction manager, in order to be able to manage the participant's actions within the transaction, to know how many participants are participating in the transaction. In a web services environment or within a transaction created and processed as a result of messages being propagated across a multiple domain architecture, determining how many participants are participating in a transaction has proven a very difficult task.

Typically, because a transaction manager does not know how many participants are participating in a transaction, the transaction manager waits for a predetermined amount of time before committing or aborting the transaction. The transaction manager assumes that all participants who are participating within the transaction will register with the transaction manager within the period of time that the transaction manager is required to wait. This, therefore, has a number of disadvantages. Firstly, the transaction manager may commit or abort a transaction unnecessarily, for example, committing the transaction without realizing that a participant has not registered. Secondly, the transaction manager may, for example, be requested to wait for a period of time (e.g., two minutes) before it commits or aborts the transaction. In this time all of the participants may have registered with the transaction manager within the first thirty seconds of the transaction manager's wait period. Thus, the transaction manager has to wait for another one and a half minutes before it can commit or abort the transaction.

Clearly, this imposes a delay in all transactions and is extremely prone to errors due to late or non-registration of participants.

SUMMARY OF THE INVENTION

Viewed from a first aspect, the present invention provides a method for determining whether a plurality of participants who are participating in a distributed transaction have registered their intention to commit their part of the transaction with a transaction manager. The method comprises the steps of: receiving a message from a participant, the message comprising a character sequence identifying the participant and the part of the transaction which the participant is processing; analyzing the character sequence to determine whether the character sequence further comprises an identifier for identifying whether a subsequent message is to be received by a second participant; and in dependence on the identifier identifying that there are no further subsequent messages to be received, informing each of the participants to commit their part of the transaction.

A transaction manager receives a message from a participant participating in a transaction. The message comprising a character sequence identifying the participant and the part of the transaction that the participant is processing. The transaction manager on receiving the message analyzes the character sequence to determine whether there are any more messages to be received from other participants. For example, if the character sequence comprises the character sequence 1.2n, and the transaction manager has not received from a further participant the character sequence 1.1, the transaction manager knows that it is waiting for one more message, i.e., 1.1. Further, when the transaction manager has received the character sequence from another participant of 1.1, the transaction manager is able to identify that there are no further messages to be received, as the character 'n' identifies no more messages and the transaction manager has already received 1.1 and 1.2n. Therefore, the transaction manager is able to inform each of the participants to commit their part of the transaction.

Preferably, on identifying that there is a subsequent message to be received from a participant, a wait operation is performed until it is determined that there are no further messages to be received. If the character sequence indicates that there are further messages to be received, the transaction manager performs a wait operation and waits for the next character sequence to be received. The character sequences may be received from other participants in any order and as each message is received the character sequence is stored in a data store, for sorting and optimizing, such that the transaction manager can quickly detect whether it is waiting for any further messages.

Preferably, the present invention provides a method wherein the constituent parts of the character sequence comprise a first part identifying the parent transaction; a second part identifying a child transaction and a subsequent part identifying whether there are any more child transactions to be processed.

Preferably, the present invention provides a method wherein the received message further comprises a transaction identifier uniquely identifying the parent transaction.

Viewed from a second aspect the present invention provides a method for generating a character sequence for identifying a plurality of participants who are participating in a distributed transaction, the method comprising the steps of: receiving a request to process a transaction; determining at least one participant to process the requested transaction; generating a character sequence for assigning to the at least one identified participant, the character sequence comprising a first identifier for identifying the participant and a second identifier for identifying the part of the transaction the participant is processing; and creating a payload, the payload comprising the generated character sequence for communicating to the at least one identified participant.

As a transaction is received, a lookup is performed in a data store to determine which participants are required to process the transaction. For example, in order to debit ten pounds from a bank account, a sub-transaction may be required to look up the account name, check the account balance and deduct the ten pounds from the bank account. For each identified participant, a character sequence is generated indicating the top level transaction, i.e., the request and the participant processing the sub-transaction, for example, 1. being the request to process the transaction and 2 indicating that there are two sub-processes. Hence, the generated sequences for each of the identified participant being 1.1 and 1.2. If there are only two identified sub-transactions, the generated character sequence 1.2 comprises a further identifier 'n' for indicating that 1.2n is the last sub-transaction at this level. It will be understood by the person skilled in the art that a transaction may comprise many levels of sub-processes.

Preferably, the present invention provides a method wherein the step of generating further comprises appending a character to the character sequence to identify the last identified participant processing their part of the transaction.

Preferably, the present invention provides a method wherein, the character sequence comprises a notation identifying the constituent parts of the character sequence.

Preferably, the present invention provides a method wherein the constituent parts of the character sequence comprise a first part identifying the parent transaction; a second part identifying a child transaction; and a subsequent part identifying whether there are any more child transactions to be processed.

Preferably, the present invention provides a method comprising the step of storing the received message in a data store.

Viewed from a third aspect, the present invention provides a system for determining whether a plurality of participants participating in a transaction has registered their intention to commit their part of the transaction with a transaction manager, the system comprising: a pass-through agent for determining at least one participant for processing a transaction; the pass-through agent generating a character sequence for assigning to the at least one identified participant participating in the transaction, the character sequence identifying the participant and the part of the transaction which the at least one participant is processing; a transaction manager for receiving a message from at least one of the identified participants, the received message comprising the generated character sequence; the transaction manager, analyzing the character sequence to determine whether the character sequence further comprises an identifier, the identifier identifying whether a subsequent message is to be received by a participant; and the transaction manager, on dependence of the identifier identifying that there are no further subsequent messages to be received, informing each of the participants to commit their part of the transaction.

Preferably, the present invention provides a system wherein the character sequence comprises a notation identifying the constituent parts of the character sequence.

Preferably, the present invention provides a system wherein the constituent parts of the character sequence comprise a first part identifying the parent transaction; a second part identifying a child transaction; and a subsequent part identifying whether there are any more child transactions to be processed.

Preferably, the present invention provides a system further comprising a data store for storing the received message.

Preferably, the present invention provides a system wherein the pass-through agent determines at least one participant for processing a transaction by performing a lookup in a data store.

Preferably, the present invention provides a system wherein the pass-through agent further determines whether the received transaction request comprises a transaction identifier.

Preferably, the present invention provides a system wherein in response to a negative determination, the pass-through agent generates a transaction identifier, wherein the transaction identifier is indicative of the top level of a transaction processing hierarchy.

Viewed from a fourth aspect the present invention provides a computer program product loadable into the internal memory of a digital computer, comprising software code portions for performing, when said product is run on a computer, to carry out the invention as described above.

BRIEF DESCRIPTION OF THE DRAWINGS

Embodiments of the invention are described below in detail, by way of example only, with reference to the accompanying drawings in which:

FIG. 4 illustrates an example of a transaction manager of FIG. 2 interacting with each participant of a transaction;

FIG. 6 details a flow chart of the operational steps of the pass-through agent of FIG. 2; and FIG. 7 details a flow chart of the operational steps of the transaction manager of FIG. 2.

DETAILED DESCRIPTION OF THE INVENTION

Figure 1:
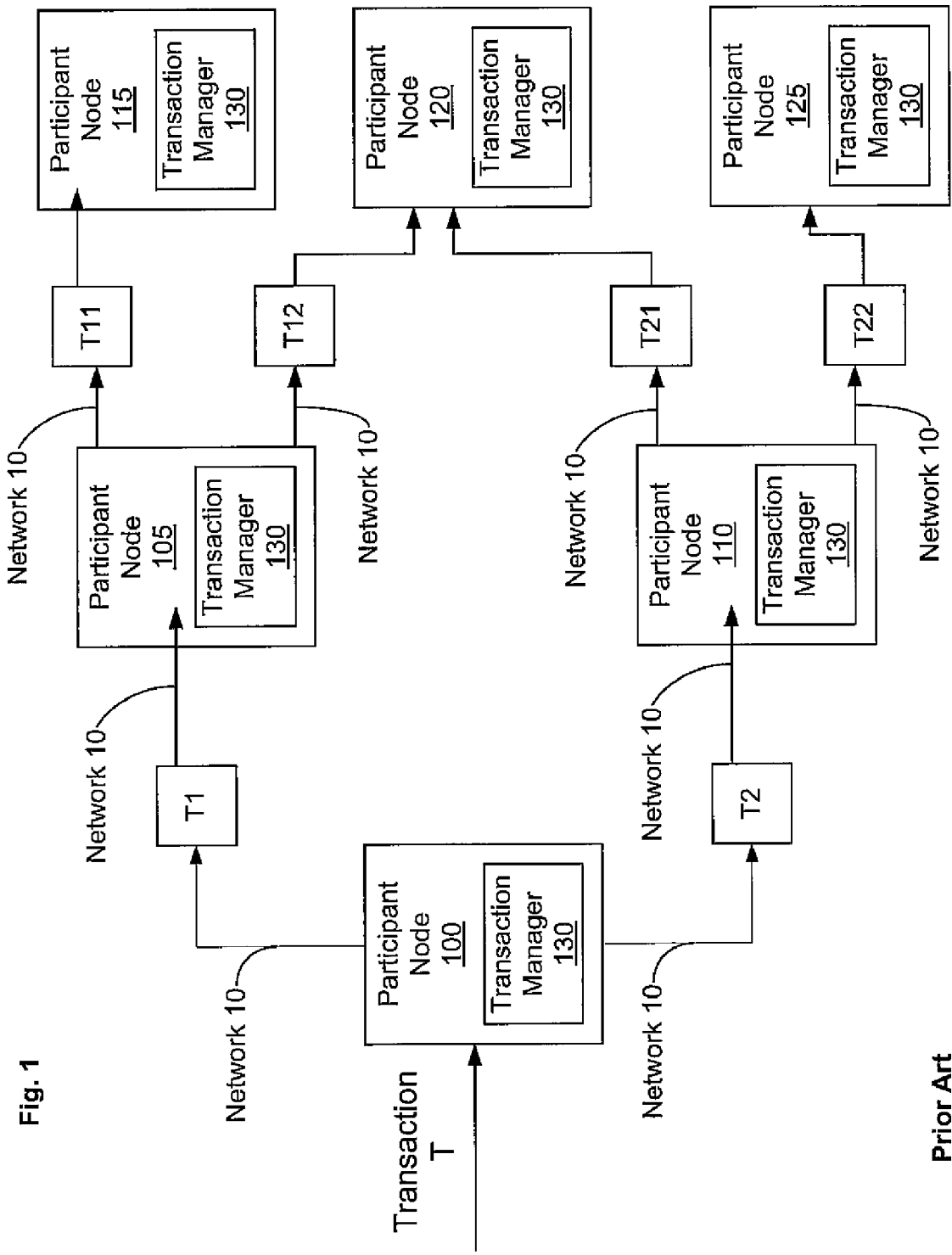
FIG. 1 shows a prior art distributed computing environment in which the present invention may be embodied.

FIG. 1 illustrates a prior art embodiment of a distributed networked computing environment for processing one or more transactions initiated by one or more participant nodes 100, 105, 110, 115, 120 and 125. Each participant node 100, 105, 110, 115, 120, 125 communicates with other participant nodes 100, 105, 110, 115, 120, 125 by bi-directional communication lines to a network 10 of participant nodes 100, 105, 110, 115, 120 and 125. Although, the network 10 may be the Internet, other networks, such as local-area networks, wide-area networks, or wireless networks, or any other applicable networks are deployed. The network 10 is operable for working with the appropriate network protocols, such as, HTTP, SLQ or other proprietary protocols.

The participant nodes 100, 105, 110, 115, 120 and 125 are operable across many different types of networks 10. For example, participant node 105 may be accessed via the Internet, participant nodes 110 and 115 may be located behind a companies' firewall and accessible via the companies' intranet and lastly, participant nodes 115, 120, and 125 may only be accessible via the Internet. It will be appreciated by a person skilled in the art that other forms of network permutations are possible.

Each participant node 100, 105, 110, 115, 120, 125 comprises a transaction manager 130 for receiving and processing a transaction request and handling such protocols as two-phase commit in order to commit a transaction (T) processed by other participant nodes. Any one of the transaction managers 130 on each of the participant nodes 100, 105, 110, 115, 120, 125 may be nominated to manage a transaction (T) in order to commit a transaction (T).

A transaction (T) is initiated by a first participant node (not shown), for example, an ATM machine. The transaction (T) may take the form of a request, for example, to withdraw ten pounds from a bank account, to purchase a particular item and consequently debit a bank account with the monetary value of the item, or to update personal information, such as, a change of address, etc. All of these examples of transactions (T) may require access to a variety of different resources in order to fulfill the transaction request. In order to access different resources, which may be physically located in another location or accessible via a different communication medium, a transaction (T) may initiate a number of sub-transactions T1, T2, T11, T12, T21, and T22. These sub-transactions T1, T2, T11, T12, T21, and T22 may be carried out concurrently.

For example, as shown in FIG. 1, a transaction T is received by a first participant node 100, the transaction request comprising an instruction to debit ten pounds from bank account 0123, and credit bank account 45676 with ten pounds. Transaction T receives the request and initiates sub-transaction T1 to look up the name of the account from which the money is to be debited, and concurrently initiates transaction T2 to look up the account name of the account to which the money is to be credited. On completion of T1, sub-transaction T1 initiates sub-transactions T11 and T12 to get the balance of the account and determine whether there is enough money in the account to debit the account with ten pounds. Sub-transaction T2, on completion of looking up the account name, receives the ten pounds and initiates sub-transactions T21 and T22 to credit the account. On completion of these sub-tasks, the controlling transaction manager after a predetermined period of time waits for a reply from each of the relevant sub-transactions informing the transaction manager that they have completed their sub-transactions. The transaction manager, in response to the responses from the sub-transactions, either commits the transaction or aborts it. As can be seen, the problem of having to wait for a response from each sub-transaction is a time consuming task, as the transaction manager 130 does not know how many participant nodes 100, 105, 110, 115, 120, 125 there are in a transaction (T) and consequently, the transaction manager 130 could have received responses from all participant nodes 100, 105, 110, 115, 120 and 125 and therefore be incurring a wait which is unnecessary.

Figure 2:
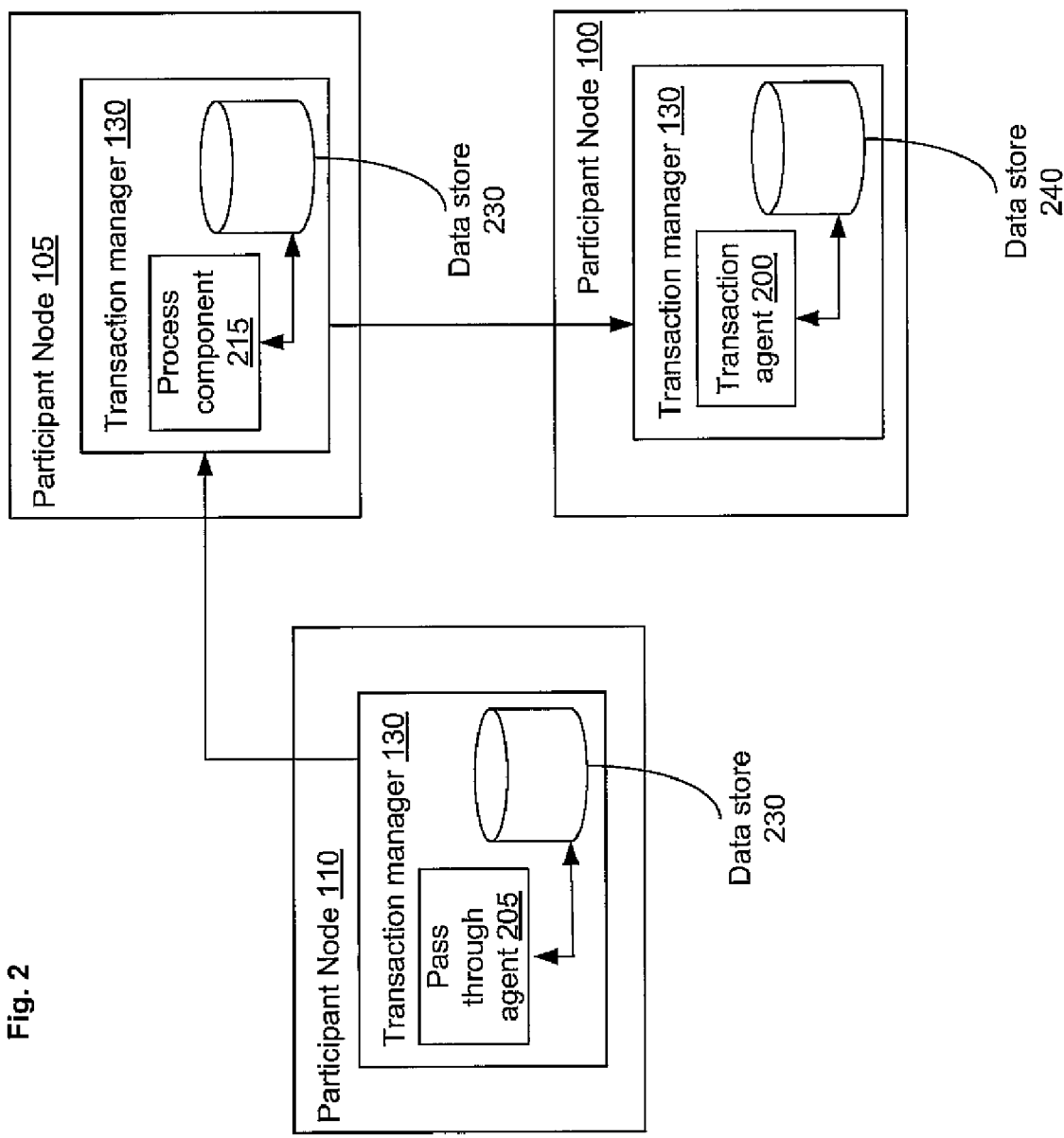
FIG. 2 shows a schematic representation of a pass-through agent, a participant, and a transaction manager of the present invention.

In order to solve the above problem, with reference to FIG. 2, the present invention provides a pass-through agent 205 which is operable for use on each of the participant nodes 100, 105, 110, 115, 120, 125; a transaction agent 200 operable with a transaction manager 130; and a processing component 215 suitable for use with each participant node 100, 105, 110, 115, 120, 125.

The pass-through agent 205 comprises an application, server, or messaging broker which is operable for providing a number of operations in response to a received transaction (T), assigning a transaction identifier, assigning a transaction manger 130 and a number sequence as part of a number sequence for identifying how many participant nodes 100, 105, 110, 115, 120, 125 there are for any received transaction.

The pass-through agent 205 receives a transaction request which comprises an instruction, for example, type=debit ATM, debit 10 pounds, from account 1234. The pass-through agent 205 parses the instruction and performs a lookup in a data store 230 to determine which participant nodes 100, 105, 110, 115, 120, 125 are required in order to fulfill the transaction request. The pass-through agent also assigns a unique identifier and assigns an available transaction manager 130. The unique identifier may be any identifier which is globally unique across all transactions managed by the transaction manager 130. In order to allow the transaction manager 130 to determine how many participant nodes 100, 105, 110, 115, 120, 125 are participating within a transaction (T), pass-through agent 205 assigns a first number within a unique number sequence to the required processing node. A payload is constructed for each required participant node 100, 105, 110, 115, 120, 125 comprising the type of transaction to be performed, the unique identifier of the transaction (T), the assigned transaction manager 130 and the first or next number in the unique number sequence for communicating to each required participant node 100, 105, 110, 115, 120, 125.

The pass-through agent 205 may be located on any participant node 100, 105, 110, 115, 120, 125 which becomes a participant within a transaction (T).

A transaction agent 200 is provided that improves and enhances the existing functionality of prior art transaction managers 130. The transaction agent 200 receives responses from each participant node 100, 105, 110, 115, 120, 125 involved in processing the transaction (T); stores and analyses the responses; detects the completeness of the responses stored; and in response to the completeness of the responses, manages the two phase commit phase of the transaction (T).

Each participant node 100, 105, 110, 115, 120, 125 comprises a process component 215 for cooperating with a transaction manager 130 and for processing a payload received from a pass-through agent 205. The processing component 215 registers with a transaction manager 130 after completion of its part of a transaction (T), processing any instructions received from a transaction manager 130 and keeping the port in which any incoming requests are received secure.

Figure 3:
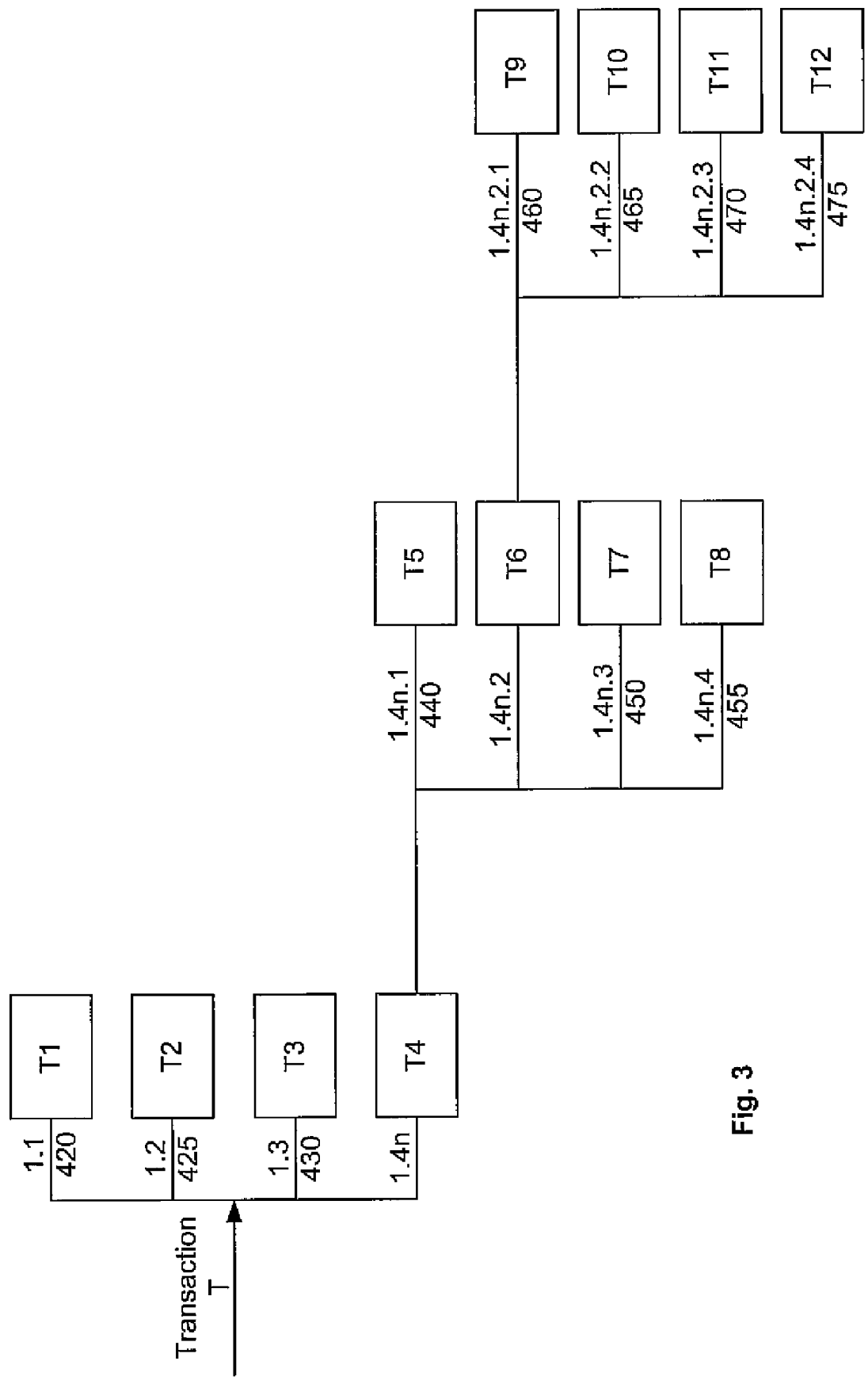
FIG. 3 shows a schematic representation of the pass-through agent generating a part of a number sequence for assigning to each identified participant according to the present invention.

Moving on to FIG. 3, the operation of the pass-through agent 205 is explained in greater detail. On receiving a transaction (T), the pass-through agent performs a lookup in a data store to determine which sub-transactions should be invoked in order to fulfill the requirements of the transaction (at this immediate step, the list contains only the first child level of the process. It does not contain the complete list of all transaction participants). In the example of FIG. 3, sub-transactions T1, T2, T3, and T4 are required. The pass-through agent 205, being the first pass-through agent encountered by the transaction request, generates a unique ID for the transaction (T) and assigns a transaction manager 130 to manage the transaction (T). Then, for each sub-transaction that is identified by the lookup function, the pass-through agent 205 generates a unique number belonging to part of a number sequence. Each number is generated sequentially and it is important that there are no numerical gaps in the number sequence. As many sub-transactions may be initiated by other sub-transactions and a pass-through agent 205 has only the sub-transactions visible at its child level, a notation is required to indicate that there are further participants participating in the transaction (T). The notation in this example is denoted by the character 'n', although it will be appreciated by a person skilled in the art that other types on notation may be used.

The above explanation is explained further by working through an example. With reference, once again, to FIG. 3, a pass-through agent 205 receives a transaction (T), and a lookup is performed in its data store 230 to determine which sub-transactions are required in order to fulfill the transaction request. Responsive to the lookup, sub-transactions T1, T2, T3, and T4 are invoked. For each identified sub-transaction, the pass-through agent 205 generates a unique number as part of a number sequence. Sub-transaction T1 is assigned the first part of the number sequence 1.1. The first part of the number sequence denoted by the numerical value '1' denotes that the sub-transaction is part of the transaction number 1. The second part of the number sequence noted after the '.' (period) comprises a further numerical value. In this example, the numerical value '1' after the period denotes that the sub-transaction is the first sub-transaction of the transaction T.

Moving on, sub-transaction T2 is assigned the next logical number in the number sequence, i.e., 1.2. T3 is assigned the next number in the number sequence, 1.3; and T4 is assigned the next number in the number sequence, 1.4n. Because the pass-through agent 205 determined that there were four sub-transactions which were required in order to fulfill the transaction request, the pass-through agent 205 appends the sub-transaction T4 with the character 'n' to denote that this is the last sub-transaction at this level. In this example, transaction T4 can not be completed by the participant as further sub-transactions are required in order to fulfill the request. Therefore, the value 1.4n is passed to the pass-through agent 205 and a further lookup is performed in a data store 230 to determine which further sub-transactions are required. Once this lookup has been performed and the sub-transactions identified, the generation of the number sequence is continued by the pass-through agent. Hence, sub-transaction T5 is assigned the identifier 1.4n.1, meaning that the sub-transaction T5 is the sub-transaction of sub-transaction T4 and transaction T. Moving on through the illustration, sub-transaction T6 is assigned the number sequence 1.4n.2, sub-transaction T7 is assigned the number sequence 1.4n.3, and sub-transaction T8 is assigned the number sequence 1.4n.4n. As explained previously, the character 'n' denotes the last sub-transaction at the level of T4. Moving back to sub-transaction T6, transaction T6 can not be fulfilled by T6, as further sub-transactions are required. Again, the pass-through agent 205 performs a lookup and determines the sub-transactions required in order to fulfill the transaction request. Sub-transactions T9, T10, T11, and T12 are identified, and the pass-through agent 205 assigns the next numbers in the number sequence. Sub-transaction T9 is assigned the number sequence 1.4n.2.1; T10 is assigned the next part of the number sequence, 1.4n2.2; T11 is assigned the next part of the number sequence 1.4n2.3; and T12 is assigned the final part of the number sequence, 1.4n.2.4n, indicating that T12 is the last sub-transaction that is required in order to fulfill the transaction request.

Each sub-transaction, upon completing its task, communicates its acknowledgment of the completed task to the transaction manager 130. Each sub-transaction knows the identity of the transaction manager 130 because the identifier of the transaction manager is contained within each payload communicated to each sub-transaction. Each sub-transaction can communicate with the transaction manager 130 in an asynchronous manner. Each sub-transaction on completion of its task communicates to the transaction manager 130, the identifier of the transaction, acknowledgement that the sub-transaction is ready to commit its part of the transaction and its part of the generated number sequence.

On receiving this information from each of the sub-transactions, the transaction agent 200 determines from the notation whether there are any more sub-transactions (or participants) required before the transaction manager 130 can proceed to commit the transaction (T).

Using the example of FIG. 3 and the information from the table of FIG. 4, the transaction agent 200 can determine the following:

No Transaction Received (415)
    No action to be taken;
Transaction T1 Acknowledges Completion and Identifies Itself as Transaction Part 1.1 (420)
    The transaction agent 200 identifies that it is waiting for more messages from more sub-transactions;
Transaction T2 Acknowledges Completion and Identifies Itself as Transaction Part 1.2 (425)
    The transaction agent 200 identifies that it is waiting for more messages from more sub-transactions;
Transaction T3 Acknowledges Completion and Identifies Itself as Transaction Part 1.3 (430)
    The transaction agent 200 identifies that it is waiting for more messages from more sub-transactions;
Transaction T5 Acknowledges Completion and Identifies Itself as Transaction Part 1.4n.1 (440)
    The transaction agent 200 identifies that no more messages are expected at the 1.4n level, but further 1.4n. messages are expected. Note that in this instance no message is received from sub-transaction T4 as the participant is a pass-through agent (435). No message is received from 1.4n.2 because this participant is also a pass-through agent (445);
Transaction T5 Acknowledges Completion and Identifies Itself as Transaction Part 1.4n.3 (450)
    The transaction agent 200 identifies that it is waiting for more messages from more sub-transactions;
Transaction T6 Acknowledges Completion and Identifies Itself as Transaction Part 1.4n.4n (455)
    The transaction agent 200 identifies that no more 1.n.n messages are expected;
Transaction T7 Acknowledges Completion and Identifies Itself as Transaction Part 1.4n.2.1 (460)
    The transaction agent 200 identifies that it is waiting for more messages from more sub-transactions;
Transaction T8 Acknowledges Completion and Identifies Itself as Transaction Part 1.4n.2.2 (460)
    The transaction agent 200 identifies that it is waiting for more messages from more sub-transactions;
Transaction T9 Acknowledges Completion and Identifies Itself as Transaction Part 1.4n.2.3 (465)
    The transaction agent 200 identifies that it is waiting for more messages from more sub-transactions; and
Transaction T10 Acknowledges Completion and Identifies Itself as Transaction Part 1.4n.2.4n (475)
    The acknowledgement identifies the final participant of the transaction.

Thus, the transaction agent 200 is able to identify that there are ten participants 420, 425, 430, 435, 440, 445, 455, 460, 465, 470 within the transaction (T). The transaction agent 200, on receiving each of the messages of acknowledgement, writes the transaction's identifier and the number sequence in a data store 240. The transaction agent 200 optimizes the data entries within the data store by placing each entry in numerical order in order to quickly determine which participants are still expected to send an acknowledgement message.

Figure 5:
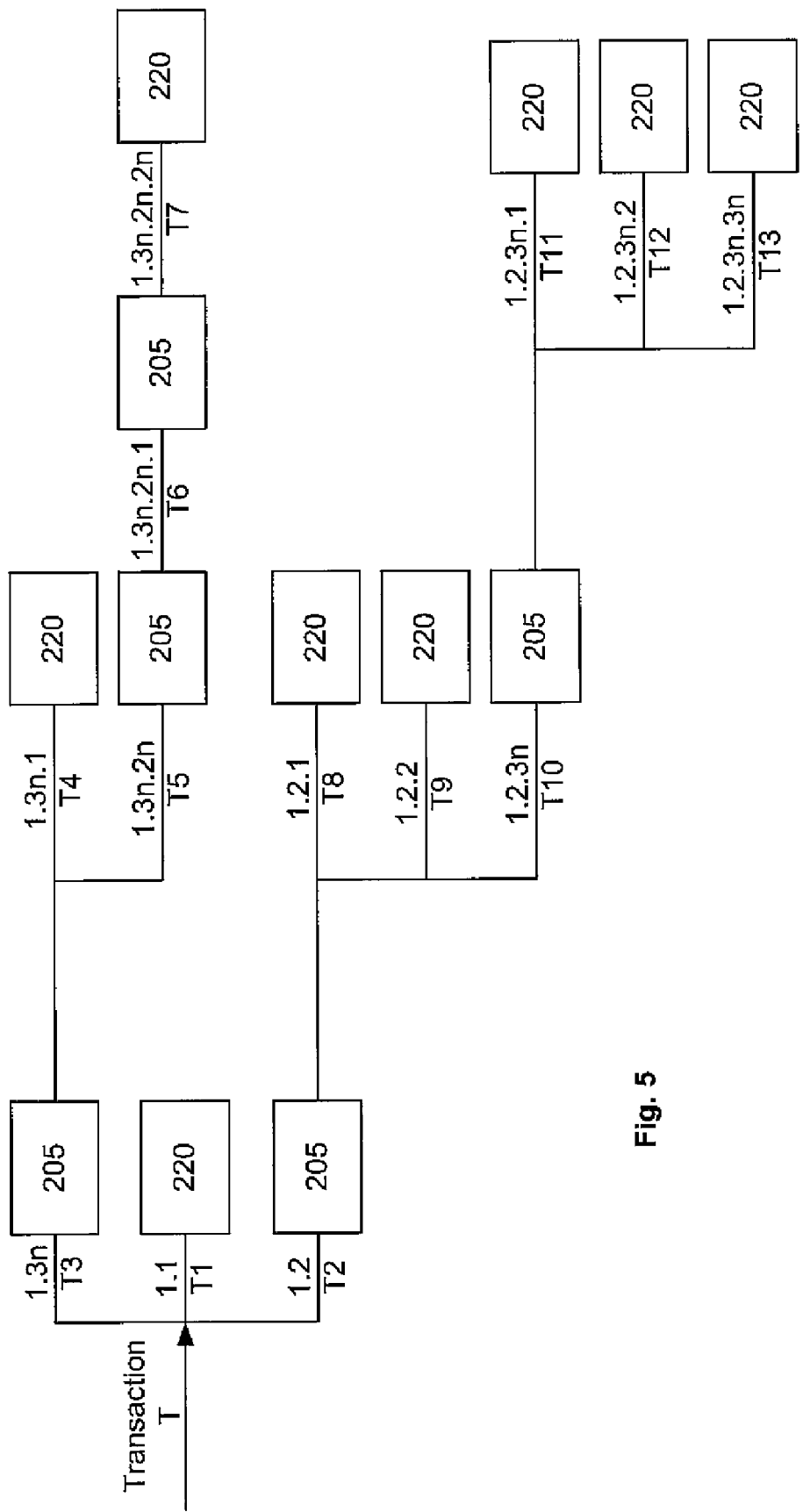
FIG. 5 illustrates a further example of operation of the pass-through agent of the present invention.

Moving on to FIG. 5, a further example of the generation of a number sequence is illustrated. A pass-through agent receives a transaction (T) and performs a lookup in a data store 230 and determines that participants T1, T2, and T3 are required in order to fulfill the transaction request. The pass-through agent 205 generates a unique identifier for the transaction (T) and assigns a transaction manager 130 to manage the commit phase of the transaction. The pass-through agent 205 proceeds to assign part of a number sequence to each identified participant, namely, T1 is assigned the identifier 1.1, T2 is assigned the identifier 1.2, and T3 is assigned the identifier 1.3n, which identifies to the transaction manager 130 that T3 is the last participant and that it should expect no more messages at the 1.n level. Although T2 is assigned the part of the number sequence 1.2, the participant determines that it can not fulfill its part of the transaction without the cooperation of further participants 220. The pass-through agent 205 located on T2 performs a lookup in a data store and determines which other participants 220 are required, in this example, T8, T9, and T10. The pass-through agent 205 constructs a payload, only this time, it already knows the transaction ID and the identification of the transaction manager 130 from the communicated payload. Therefore, the pass-through agent 205 proceeds to generate the next part of the number sequence for assigning to each identified participant, namely, T8 is assigned the identifier 1.2.1, T9 is assigned the identifier 1.2.2, and T10 is assigned the identifier 1.2.3n.

T10 determines that it can not fulfill its part of the transaction (T) and therefore performs a lookup to determine which other participants are required. Because other participants are required, the pass-through agent 205 generates the number sequence 1.2.3n.1 to indicate that further participants are expected to register with the transaction manager 130. Hence participant T11 is assigned the identifier 1.2.3n.1, T12 is assigned the identifier 1.2.3n.2, and T13 is assigned the identifier 1.2.3n.3n, indicating that there are no more participants at this level.

Moving back to T3, although T2 is assigned the part of the number sequence 1.2, the participant determines that it can not fulfill its part of the transaction without the cooperation of further participants. The pass-through agent located on T3 performs a lookup in a data store and determines which other participants are required, in this example, T4 and T5. The pass-through agent 205 constructs a payload, only this time, it already knows the transaction ID and the identification of the transaction manager from the communicated payload. Therefore, the pass-through agent 205 proceeds to generate the next part of the number sequence for assigning to each identified participant, namely, T4 is assigned the identifier 1.3n.1, and T5 is assigned the identifier 1.3n.2n.

Although T5 is assigned the part of the number sequence 1.3n.2n, the participant determines that it can not fulfill its part of the transaction without the cooperation of further participants. The pass-through agent 205 located on T5 performs a lookup in a data store and determines which other participants are required, in this example, T6 and T7. The pass-through agent constructs a payload, only this time, it already knows the transaction ID and the identification of the transaction manager 130 from the communicated payload. Therefore, the pass-through agent 205 proceeds to generate the next part of the number sequence for assigning to each identified participant, namely, T6 is assigned the identifier 1.3n.2n.1, and T7 is assigned the identifier 1.3n.2n.2n.

Thus, the transaction agent 200 can determine from the above number sequences that there are eight participants 220 from which is should expect acknowledgement messages, i.e. T1, T8, T9, T11, T12, T13, T4 and T7. The participants T3, T2, T5, T6 and T10 are pass-through agents 205, and accordingly are not required to report into the transaction manager, as the pass-through agents do not process any part of the transaction T.

Moving onto FIGS. 6 and 7 the operational steps of the pass-through agent 205 and the transaction manager 130 and transaction agent 200 are illustrated.

Firstly with reference to FIG. 6, the pass-through agent 205 receives a transaction request at step 600. Control moves to step 605 and the pass-through agent 205 determines whether the transaction (T) has a transaction identifier. If the response is positive, the pass-through agent performs a lookup in a data store to determine which sub-transaction(s) are required in order fulfill the transaction request. On identification of one or more sub-transactions, a next number in the number sequence is generated at step 635 and a payload is constructed comprising: the generated next part of the number sequence; the transaction identifier; and transaction manager 130 identifier at step 640.

Moving back to step 605, if the response is negative, the pass-through agent 205 assigns a unique transaction identifier to the transaction at step 610 and at step 615 assigns a transaction manager 130 to the transaction (T). A lookup is performed in a data store to determine which sub-transactions are required in order to fulfill the transaction request, at step 620. For each identified sub-transaction, the first part of a number sequence is generated at step 625 and a payload is constructed comprising: the transaction identifier, the transaction type, and the transaction manager identifier, at step 630. The payload is then communicated to each identified sub-transaction. The above steps are repeated for each transaction received by the pass-through agent 205.

FIG. 7 details the operational steps of the transaction agent 200 on the transaction manager 130 on receiving an acknowledgement from one or more participants, participating in a transaction.

At step 700, the transaction manager 130 receives a message acknowledging that a participant is ready to commit their part of the transaction. The message comprises: an acknowledgement; the transaction identifier; and the transaction's part of the number sequence. The transaction manager 130 passes control to the transaction agent 200 and the transaction agent 200 writes the received number sequence to a data store pertaining to the transaction (T), at step 705. The transaction agent 200 proceeds to analyze the received part of the number sequence to determine whether it is waiting for any more participants, as explained with reference to FIG. 4, at step 710. Control moves to step 715 and a determination is made as to whether all acknowledgements from all participants have been received or whether the transaction agent 200 is expecting further acknowledgement messages. If the determination is positive, control moves to step 720, and the transaction manager prepares to manage the two phase commit stage of the transaction's processing. Alternatively, if at step 715, the determination is negative, the transaction agent 200 waits for further acknowledgements and repeats steps 705 to 720 until it is determined that no more acknowledgement messages are expected.

It will be apparent to a person skilled in the art that there are a number of possible optimizations to the way in which the notation is stored. For example, if the number of participants for any given transaction are limited to 127, then for each set of branching the notation may be;

Notation [1][2][3][4] being equivalent to 1.2.3.4 where the character [ ] indicates a byte of storage. The $128^{th}$ bit used to indicate the last participant such that; [1][2][3][4+128] is equivalent to 1.2.3.4n or [1][2+128][3][4+128] being 1.2n.3.4n. This allows 64 levels of 127 nodes to be represented in a single 64 bit integer.

These notations are optimizations of the basic method described herein. The notation described in the example embodiment herein is not intended to be limiting, as it has been used only for ease of explanation and clarity of the description, rather than optimization of storage or performance of the implemented mechanism.

It will be appreciated by a person skilled in the art that the invention may be used in other areas, for example, where there is a need to perform reconciliation across a number of consumers. For example, where a message is sent to a plurality of consumers, the method and system described herein may be used to determine whether the message was received by each of the consumers, among other non-transaction based environment applications.

It is understood that the present invention can be realized in hardware, software, or a combination of hardware and software. Any kind of computer/server hardware system(s)—or other hardware apparatus adapted for carrying out the methods described herein—is suited. A typical combination of hardware and software could be a general purpose digital computer system including an internal memory, and a computer program product loaded thereon that, when loaded and executed, controls the computer system such that it carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

The invention claimed is:

1. A computer-implemented method for generating a character sequence for identifying a plurality of participants who are participating in a distributed transaction, the method comprising the steps of:
   receiving a request to process a transaction;
   using a pass-through agent to identify at least one participant to process the transaction requested;
   generating a character sequence on the pass-through agent for assigning to the at least one identified participant, the character sequence comprising a first identifier for identifying the participant and a second identifier for identifying a part of the transaction the participant is processing;
   creating a payload, the payload comprising the generated character sequence for communicating to the at least one identified participant;
   receiving a message from at least one of the identified participants, the received message comprising the generated character sequence, wherein the message from the at least one identified participant is received, but a message from the pass-through agent is not received;
   analyzing the character sequence to determine whether the character sequence further comprises a further identifier, the further identifier identifying whether a subsequent message is to be received by a second participant; and
   informing the at least one identified participant to commit their part of the transaction on dependence of determining that there are no further subsequent messages to be received, wherein no further subsequent messages are to be received when a total number of messages received is equal to a total number of participants, and wherein the pass-through agent is not a participant.

2. A computer-implemented method as claimed in claim 1, wherein the step of generating further comprises appending a character to the character sequence to identify a last identified participant processing their part of the transaction.

3. A computer-implemented method as claimed in claim 1, wherein the character sequence comprises a notation identifying constituent parts of the character sequence.

4. A computer-implemented method as claimed in claim 3 wherein the constituent parts of the character sequence comprises:
   a first part identifying a parent transaction;
   a second part identifying a child transaction; and
   a subsequent part identifying whether there are any more child transactions to be processed.

5. A computer-implemented method as claimed in claim 1 further comprising the step of storing the received message in a data store.

6. A computer-implemented system for determining whether a plurality of participants participating in a transaction have registered their intention to commit their part of the transaction with a transaction manager, the system comprising:
   a computer including a memory; and
   a participation determining system storable in the memory and executable by the computer, the participation determining system comprising:
      a pass-through agent for identifying at least one participant for processing a transaction;
         the pass-through agent generating a character sequence for assigning to the at least one identified participant participating in the transaction, the character sequence identifying the participant and a part of the transaction which the at least one participant is processing;
      a transaction manager for receiving a message from at least one of the identified participants, the received message comprising the generated character sequence;
         the transaction manager analyzing the character sequence to determine whether the character sequence further comprises a further identifier, the further identifier identifying whether a subsequent message is to be received by a second participant, wherein the transaction manager receives the message from the at least one identified participant but does not receive a message from the pass-through agent; and
         the transaction manager informing the at least one identified participant to commit their part of the transaction on dependence of determining that there are no further subsequent messages to be received, wherein no further subsequent messages are to be received when a total number of messages received is equal to a total number of participants, and wherein the pass-through agent is not a participant.

7. A computer-implemented system as claimed in claim 6, wherein the character sequence comprises a notation identifying constituent parts of the character sequence.

8. A computer-implemented system as claimed in claim 7 wherein the constituent parts of the character sequence comprises:
   a first part identifying a parent transaction;
   a second part identifying a child transaction; and
   a subsequent part identifying whether there are any more child transactions to be processed.

9. A computer-implemented system as claimed in claim 6 further comprising a data store for storing the received message.

10. A computer-implemented system as claimed in claim 6, wherein the pass-through agent determines at least one participant for processing a transaction by performing a lookup in a data store.

11. A computer-implemented system as claimed in claim 6, wherein the pass-through agent further determines whether the received transaction request comprises a transaction identifier.

12. A computer-implemented system as claimed in claim 6, wherein in response to a negative determination, the pass-through agent generates a transaction identifier, the transaction identifier indicative of a top level of a transaction processing hierarchy.

13. A computer program product loadable into an internal memory of a digital computer, which when executed, enables the computer to determine whether a plurality of participants, who are participating in a distributed transaction, have registered their intention to commit their part of the transaction with a transaction manager, the computer instructions comprising:
   using a pass-through agent to identify at least one participant for processing a transaction;
   using the pass-through agent to generate a character sequence for assigning to the at least one identified participant participating in the transaction, the character sequence identifying the participant and a part of the transaction which the at least one participant is processing;
   receiving a message on a transaction manager from at least one of the identified participants, the message comprising the character sequence identifying the participant and the part of the transaction which the participant is processing;
   analyzing the character sequence on the transaction manager to determine whether the character sequence further comprises an identifier for identifying whether a subsequent message is to be received by one of the participants, wherein the transaction manager receives the message from the at least one identified participant but does not receive a message from the pass-through agent; and
   in dependence on the identifier, identifying that there are no further subsequent messages to be received and informing each of the participants to commit their part of the transaction, wherein no further subsequent messages are to be received when a total number of messages received is equal to a total number of participants, wherein the pass-through agent is not a participant.

\* \* \* \* \*

UNITED STATES PATENT AND TRADEMARK OFFICE
CERTIFICATE OF CORRECTION

| | | |
|---|---|---|
| PATENT NO. | : 7,953,716 B2 | Page 1 of 1 |
| APPLICATION NO. | : 12/348112 | |
| DATED | : May 31, 2011 | |
| INVENTOR(S) | : James R. H. Whyte | |

It is certified that error appears in the above-identified patent and that said Letters Patent is hereby corrected as shown below:

Title Page, Item (45) Please add an asterisk (*) before (*) Please add: This patent is subject to a terminal disclaimer.

Signed and Sealed this
Twenty-fourth Day of July, 2012

David J. Kappos
*Director of the United States Patent and Trademark Office*